(12) United States Patent
Maruyama (10) Patent No.: US 7,609,412 B2
(45) Date of Patent: Oct. 27, 2009

(54) PRINTING SYSTEM, PRINTING APPARATUS AND TERMINAL APPARATUS EMPLOYED IN PRINTING SYSTEM, AND PRINTING METHOD

(75) Inventor: Yoshiko Maruyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 918 days.

(21) Appl. No.: 10/025,759

(22) Filed: Dec. 26, 2001

(65) Prior Publication Data

US 2002/0089693 A1    Jul. 11, 2002

(30) Foreign Application Priority Data

Dec. 28, 2000   (JP)   ............... 2000-402703
Apr. 9, 2001    (JP)   ............... 2001-110579

(51) Int. Cl.
  H04N 1/60   (2006.01)
  G06F 3/12   (2006.01)
  G06K 15/00  (2006.01)
  H04N 1/00   (2006.01)

(52) U.S. Cl. ............. 358/1.9; 358/1.15; 358/1.16; 358/1.14; 358/402

(58) Field of Classification Search ........... 358/1.15, 358/1.16, 1.1; 713/155, 166, 183; 726/2, 726/9, 21; 705/44, 52; 709/225
See application file for complete search history.

(56) References Cited

U.S. PATENT DOCUMENTS 5,509,074 A * 4/1996 Choudhury et al. ......... 713/176
6,202,092 B1 * 3/2001 Takimoto .................... 709/225
6,205,478 B1   3/2001 Sugano et al.
2001/0034747 A1 * 10/2001 Fujitani et al. .............. 707/525
2002/0060808 A1 * 5/2002 Henderson et al. ......... 358/1.15

FOREIGN PATENT DOCUMENTS

| JP | 8-314648 | 11/1996 |
|---|---|---|
| JP | 9-282120 | 10/1997 |
| JP | 10-143583 | 5/1998 |
| JP | 10-161823 | 6/1998 |
| JP | 11-221945 | 8/1999 |
| JP | 2000-32033 | 1/2000 |
| JP | 2000-122976 | 4/2000 |
| JP | 2000-194627 | 7/2000 |
| JP | 2000-322219 | 11/2000 |
| JP | 2000-330750 | 11/2000 |
| JP | 2001251336 A * | 9/2001 |

* cited by examiner

Primary Examiner—Edward L Coles
Assistant Examiner—Thomas J Lett
(74) Attorney, Agent, or Firm—Oblon, Spivak, McClelland, Maier & Neustadt, L.L.P.

(57) ABSTRACT

A printing system includes a printing apparatus, a terminal apparatus for transmitting and receiving information, a notification part notifying a user of the printing apparatus of information on authority of the user to use the printing apparatus, and a network connecting the printing apparatus, the terminal apparatus, and the notification means so that information transmission and reception in the system is performed through an electrical signal via the network.

119 Claims, 8 Drawing Sheets

PRINTING SYSTEM, PRINTING APPARATUS AND TERMINAL APPARATUS EMPLOYED IN PRINTING SYSTEM, AND PRINTING METHOD

BACKGROUND OF THE INVENTION

1. Field of the Invention

The present invention generally relates to printing systems, printing apparatuses and terminal apparatuses employed in printing systems, and printing methods. The present invention relates more particularly to a printing system where a plurality of printing apparatuses are connected via a network and usage of the printing-apparatuses is restricted, and a printing apparatus and a terminal apparatus employed in such a printing system. The present invention also relates more particularly to a printing method employed in such a printing system.

2. Description of the Related Art

As more apparatuses are connected via a network in an office, a variety of users can now access printing apparatuses. Under these circumstances, several methods of restricting usage of the printing apparatuses have been proposed. According to these methods, the access right of each user or an amount of use of each printer by each user can be set in each printing apparatus so that restriction can be imposed on usage of each printing apparatus.

Japanese Laid-Open Patent Application No. 8-314648 discloses a printing apparatus including a storage part storing the access right of a user to the printing apparatus and the recording conditions (marginal conditions) of the user so as to restrict the recording output of the print data of the user.

Japanese Laid-Open Patent Application No. 9-282120 discloses a print control apparatus that controls an access of a user to a printer by determining whether a user is accessible to an object for printing based on access control information attached to the object.

Japanese Laid-Open Patent Application No. 10-161823 discloses a printing system that sets the authority of a user to use a printer apparatus for each function thereof in a database and determines whether the user is authorized to use the printer with respect to each function based on information included in a print request from the user and the usage authority thereof set in the database.

However, according to the conventional methods, it is often a manager of apparatuses (including printing apparatuses) that sets the access right of each user, so that the users are prevented from being informed immediately of changes in their access rights. Further, if the number of sheets that each user can use is restricted, a printing apparatus is prevented from performing printing any further when the number of sheets used by a user reaches the upper limit. In these cases, it is only after requesting a print job to be executed that each user is informed whether she/he is authorized to use the printing apparatus.

SUMMARY OF THE INVENTION

It is a general object of the present invention to provide a printing system, a printing apparatus and a terminal apparatus employed in the printing system, and a printing method in which the above-described disadvantage is eliminated.

A more specific object of the present invention is to provide a printing system that informs a user of a printing apparatus of any change in her/his authority to use the printing apparatus when the change is effected, and informs the user of the authority to use the printing apparatus by making an inquiry about the usage authority of the user when a terminal apparatus is activated or before the user requests a print job to be executed so as to eliminate a failure in printing caused by executing the print job without the authority to use the printer.

Another more specific object of the present invention is to provide a printing system that enables printing to be performed by modifying printing conditions even if a user does not have authority to use all the functions of a printing apparatus.

Yet another more specific object of the present invention is to provide a printing apparatus, a terminal apparatus, and a printing method employed in such printing systems.

The above objects of the present invention are achieved by a printing system including a printing apparatus, a terminal apparatus for transmitting and receiving information, a notification part notifying a user of the printing apparatus of information on authority of the user to use the printing apparatus, and a network connecting the printing apparatus, the terminal apparatus, and the notification means so that information transmission and reception in the system is performed through an electrical signal via said network.

Additionally, in the above-described printing system, the notification part may notify the user of a change in the authority of the user to use the printing apparatus when the change is effected.

Thereby, the user is informed of the change in her/his authority to use the printing apparatus immediately when the change is effected. Therefore, a failure in printing caused by executing a print job without the authority to use the printer can be eliminated.

The above objects of the present invention are also achieved by a printing apparatus including a central processing unit controlling an operation of the entire printing apparatus, and a notification part notifying a user of the printing apparatus of information on authority of the user to use the printing apparatus.

The above-described apparatus is suitable for the above-described system.

The above objects of the present invention are also achieved by a terminal apparatus including a central processing unit controlling an operation of the entire terminal apparatus, an inquiry part transmitting an inquiry as to whether a user of a printing apparatus has authority to use the printing apparatus, and a presentation part presenting the user with a result of the inquiry.

The above-described apparatus is suitable for the above-described system.

The above objects of the present invention are also achieved by a printing method including the steps of (a) setting authority of a user of a printing apparatus to use the printing apparatus; and (b) notifying the user of information on the authority of the user to use the printing apparatus through an electrical signal via a network.

Additionally, in the above-described system, said step (b) may notify the user of a change in the authority of the user to use the printing apparatus when the change is effected.

Thereby, the same effects as those of the above-described system can be produced.

The above objects of the present invention are further achieved by a storage medium including a program for printing, the program causing a computer to execute the steps of (a) setting authority of a user of a printing apparatus to use the printing apparatus, and (b) notifying the user of information on the authority of the user to use the printing apparatus through an electrical signal via a network.

Additionally, in the above-described storage medium, said step (b) may notify the user of a change in the authority of the user to use the printing apparatus when the change is effected.

Thereby, the same effects as those of the above-described system can be produced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention.

Figure 1:
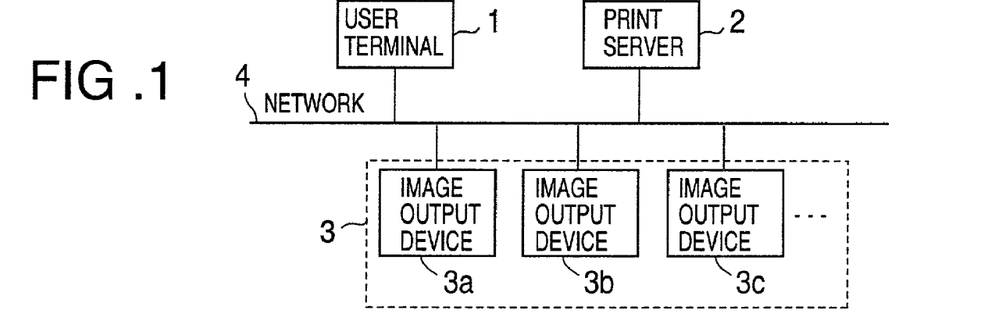
FIG. 1 is a block diagram showing a configuration of a printing system according to embodiments of the present invention.
Figure 2:
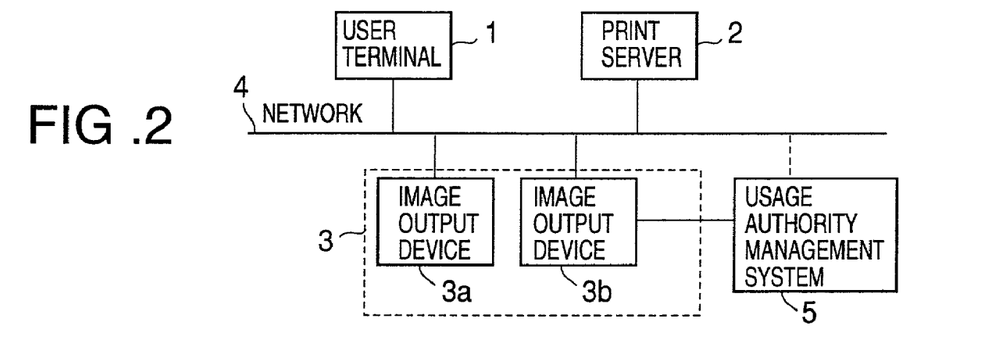
FIG. 2 is a block diagram showing a configuration of another printing system according to the embodiments of the present invention.

FIGS. 1 and 2 are diagrams showing configurations of printing systems according to the embodiments of the present invention.

Each of the systems of FIGS. 1 and 2 is composed of a user terminal apparatus 1 that makes a request for printing, a print server 2 that provides a printing function to the user terminal apparatus 1, a printer (a printing apparatus) 3, and a network 4 connecting the user terminal apparatus 1, the print server 2, and the printer 3.

The printer 3 of FIG. 1 includes image output devices (printers) 3a through 3c, and the printer 3 of FIG. 2 includes image output devices (printers) 3a and 3b.

The system of FIG. 2 includes a usage authority management system 5 provided external to the printer 3. The usage authority management system 5 manages authority of users to use the printer 3. The usage authority management system 5 may only be connected to the image output device 3b so that the image output device 3b may access the usage authority management system 5 to obtain information therefrom as required, or may be connected to a local area network (LAN) via the network 4 so that the user terminal apparatus 1 and the print server 2 may directly access the usage authority management system 5. In each of the systems of FIGS. 1 and 2, information transmission and reception is performed through an electrical signal via the network 4.

In the following description, the printer 3 refers to any of the image output devices (printers) 3a through 3c for convenience of description.

The user terminal apparatus 1 includes a central processing unit (CPU) controlling the operation of the entire user terminal apparatus 1, a memory, a storage device such as a hard disk drive (HDD) storing information obtained from the printer 3, a display for showing information to a user, an input-output device such as a keyboard, and a communication device performing communications via the network 4. Each function of the user terminal apparatus 1 is realized by the CPU reading a program from the memory and executing the program.

The printer 3 includes a central processing unit (CPU) controlling the operation of the entire printer 3, a memory, an input-output part, and a communication part performing communications via the network 4. The printer 3 may include a storage device such as a hard disk drive (HDD) and/or a display for showing information to the user. Each function of the printer 3 is realized by the CPU reading a program from the memory and executing the program.

First Embodiment

Next, a description will be given of a first embodiment of the present invention. This embodiment focuses on a case where an apparatus (printer), when there is a change in authority of a user to use the apparatus, informs the user of the change.

A printing system according to this embodiment is equal in configuration to any of the systems of FIGS. 1 and 2.

Figure 3:
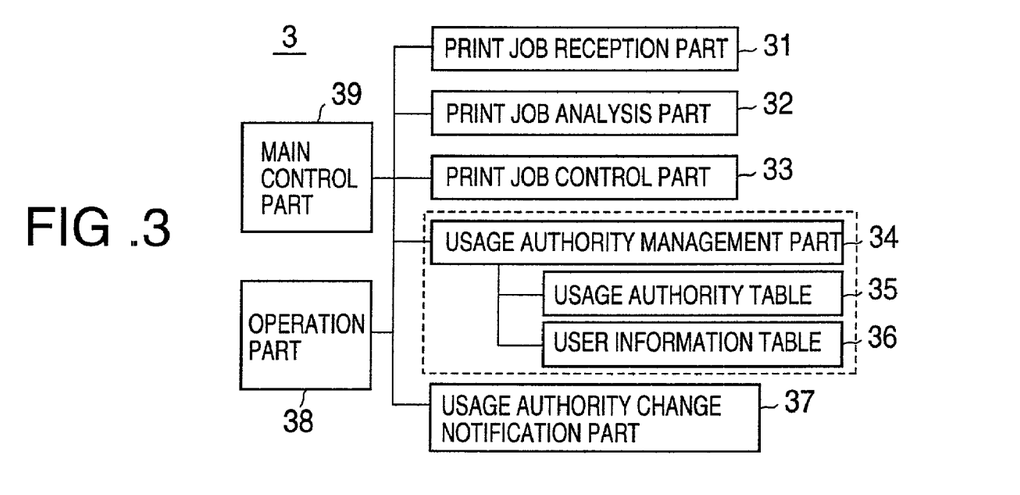
FIG. 3 is a functional block diagram of a printer according to a first embodiment of the present invention.

FIG. 3 is a functional block diagram of the printer 3 according to the first embodiment.

The printer 3 includes a print job reception part 31 that receives a print job transmitted from the user terminal apparatus 1 or a print job transmitted by way of the print server 2, a print job analysis part 32 that analyzes the received print job (print conditions), a print job control part 33 that controls a print operation, a usage authority management part 34 including a usage authority table 35 and a user information table 36, a usage authority change notification part 37 that notifies a user, when the authority of the user to use the printer 3 is newly set or changed, of the setting or change, an operation part 38 for setting the usage authority of the user and printer management parameters, and a main control part 39 managing the parts (modules) 31 through 34, 37, and 38.

Figure 4:
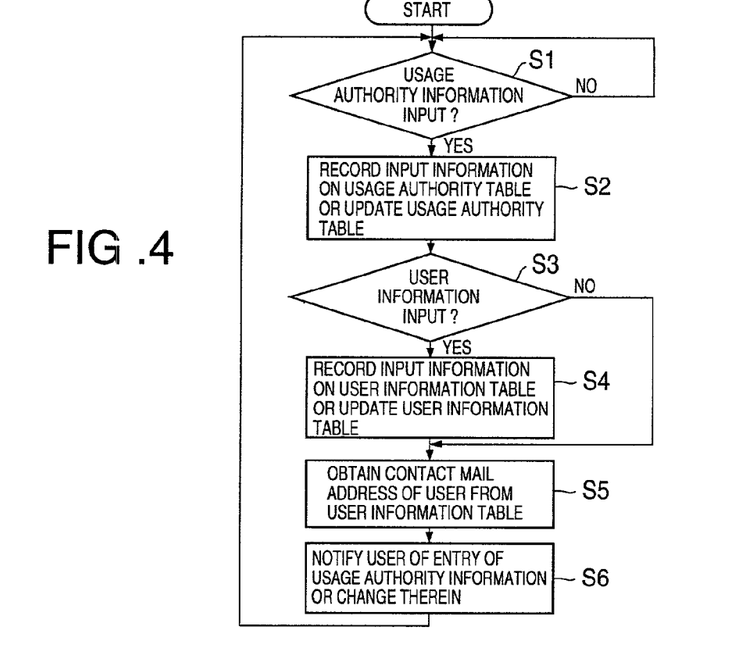
FIG. 4 is a flowchart of an operation of the printer of the first embodiment.

FIG. 4 is a flowchart of an operation of the printer 3 according to this embodiment.

In step S1, the printer 3 determines whether a printer manager has input information on the usage authority of a user through the operation part 38 or the network 4. If information on the usage authority of a user has been input (that is, "YES" in step S1), in step S2, the printer 3 records the input usage authority information in the usage authority table 35. If the user has her/his usage authority information already recorded, the printer 3 replaces the recorded information with the input information.

Next, in step S3, it is determined whether the printer manager has input information on the user. If information on the user has been input (that is, "YES," in step S3), in step S4, the printer records the input user information on the user information table 36, or updates the user information table 36. In the case of "NO" in step S3, step S5 is performed.

Then, in step S5, the printer 3 obtains a notification (contact) mail address of the user from the user information table 36, and in step S6, causes the usage authority change notification part 37 to inform the user of the new entry of its usage authority or the change in the recorded contents of the usage authority.

In this embodiment, the usage authority management part 34 having the usage authority table 35 and the user information table 36 and the usage authority change notification part 37 are provided in the printer 3, but may be provided in the print server 2 of FIG. 1 or in the external usage authority management system 5 of FIG. 2. That is, any of the systems of FIGS. 1 and 2 may be employed in this embodiment.

According to the system of the first embodiment, the user is automatically informed of a change in her/his authority to use the printer 3 when the change is effected. Therefore, the user is prevented from selecting a printer that the user is not authorized to use, thus eliminating a failure in printing caused by executing a print job without the authority to use the printer. The user is also allowed to delete the printer that the user is not authorized to use from a list of registered usable printers. Further, the user can also be informed automatically of the introduction of the printer 3 into the system when the printer 3 is introduced into the system.

Second Embodiment

Next, a description will be given of a second embodiment of the present invention. This embodiment focuses on a case where a user (client) transmits an inquiry to an apparatus (printer).

A printing system according to this embodiment is equal in configuration to any of the systems of FIGS. 1 and 2.

Figure 5:
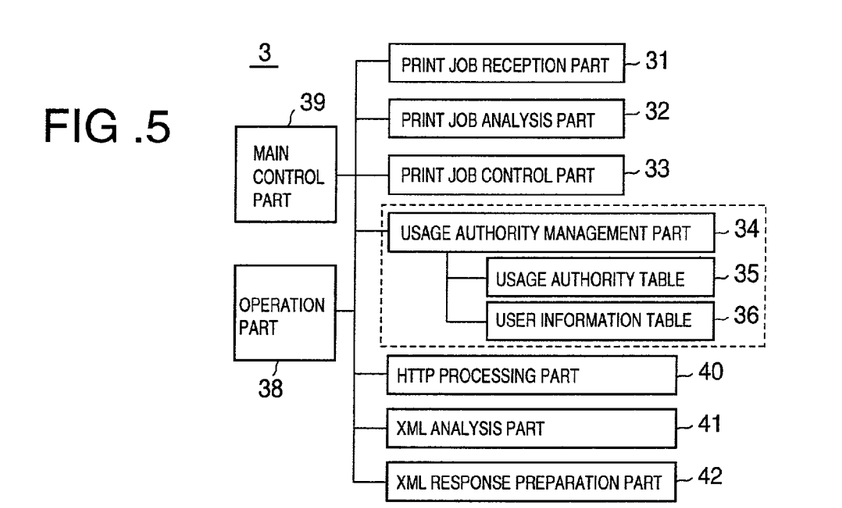
FIG. 5 is a functional block diagram of the printer according to a second embodiment of the present invention.

FIG. 5 is a functional block diagram of the printer 3 according to the second embodiment of the present invention. In FIG. 5, the same elements as those of FIG. 3 are referred to by the same numerals, and a description thereof will be omitted.

In addition to the configuration of FIG. 3, the printer 3 of FIG. 5 includes an HTTP (Hypertext Transfer Protocol) processing part 40 that performs processing in compliance with the HTTP to receive an inquiry transmitted from a user by the HTTP and respond to the inquiry, an XML (Extensible Markup Language) analysis part 41 that analyzes the inquiry coded in XML, and an XML response preparation part 42 for returning information on usage authority of the user in response to the inquiry.

Figure 6:
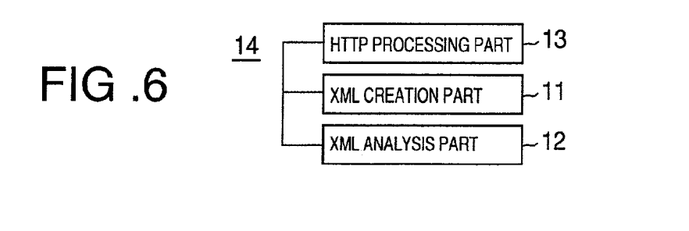
FIG. 6 is a functional block diagram of a usage authority inquiry part of a user terminal apparatus according to the second embodiment.

FIG. 6 is a functional block diagram of a usage authority inquiry part 14 that is incorporated into the user terminal apparatus 1.

The usage authority inquiry part 14 includes an XML creation part 11 that creates an inquiry about the usage authority of the user by using XML, an XML analysis part 12 that analyzes a response coded in XML from the printer 3 and obtains information on the usage authority of the user, and an HTTP processing part 13 that performs processing in compliance with the HTTP to communicate with the printer 3 by using the HTTP.

Figure 7:
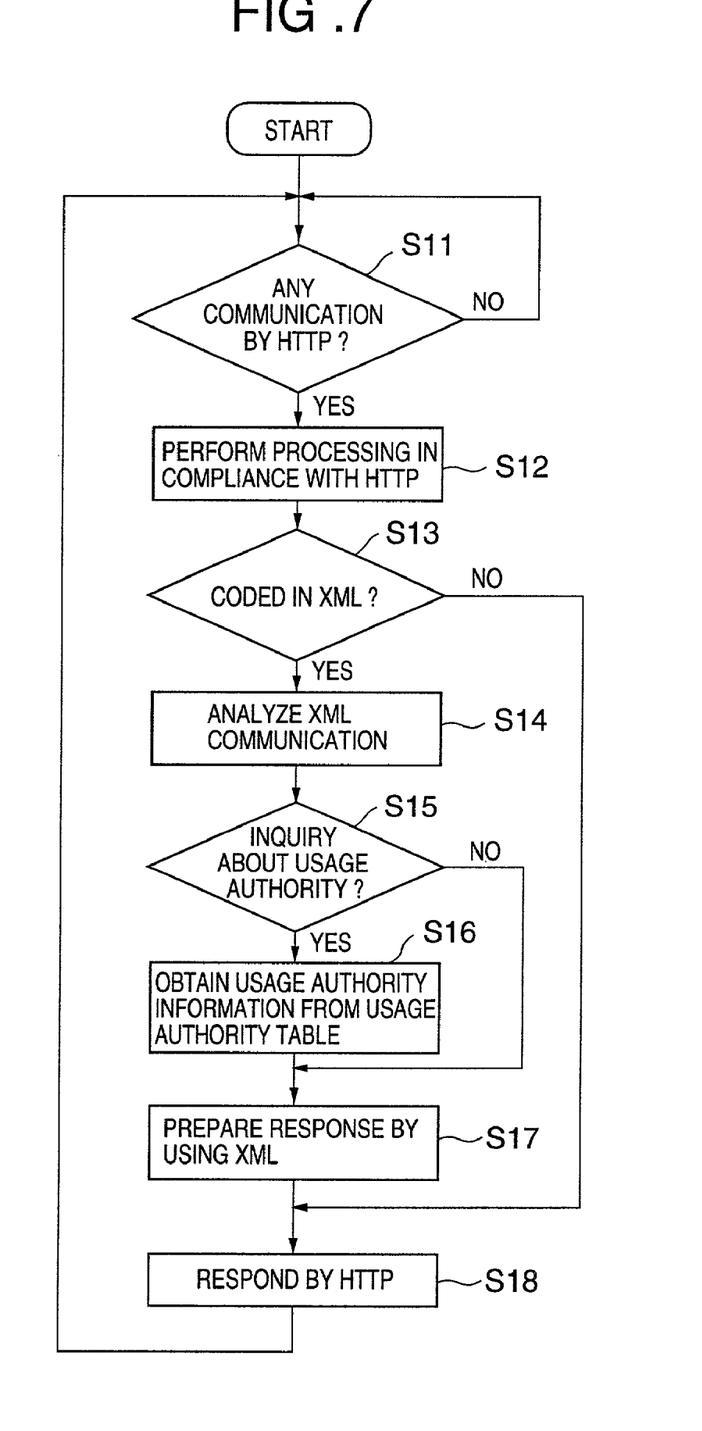
FIG. 7 is a flowchart of an operation of the printer of the second embodiment.

FIG. 7 is a flowchart of an operation of the printer 3 according to this embodiment.

In step S11, the printer 3 determines whether there is a communication by the HTTP. If there is a communication by the HTTP (that is, "YES" in step S11), in step S12, the printer 3 performs processing in compliance with the HTTP.

Next, in step S13, the printer 3 determines whether the communication is coded in XML. If the communication is coded in XML (that is, "YES" in step S13), in step S14, the printer 3 analyzes the XML communication. In the case of "NO" in step S13, step S18 is performed.

Then, in step S15, the printer 3 determines whether the communication is an inquiry about information on the usage authority of the user. If the communication is an inquiry about information on the usage authority of the user (that is, "YES" in step S15), in step S16, the printer 3 obtains the usage authority information from the usage authority table 35. In the case of "NO" in step S15, step S17 is performed. In step S17, the printer 3 prepares a response of the obtained information by using XML. In step S18, the printer 3 returns the response to the user terminal apparatus 1 by the HTTP.

Figure 8:
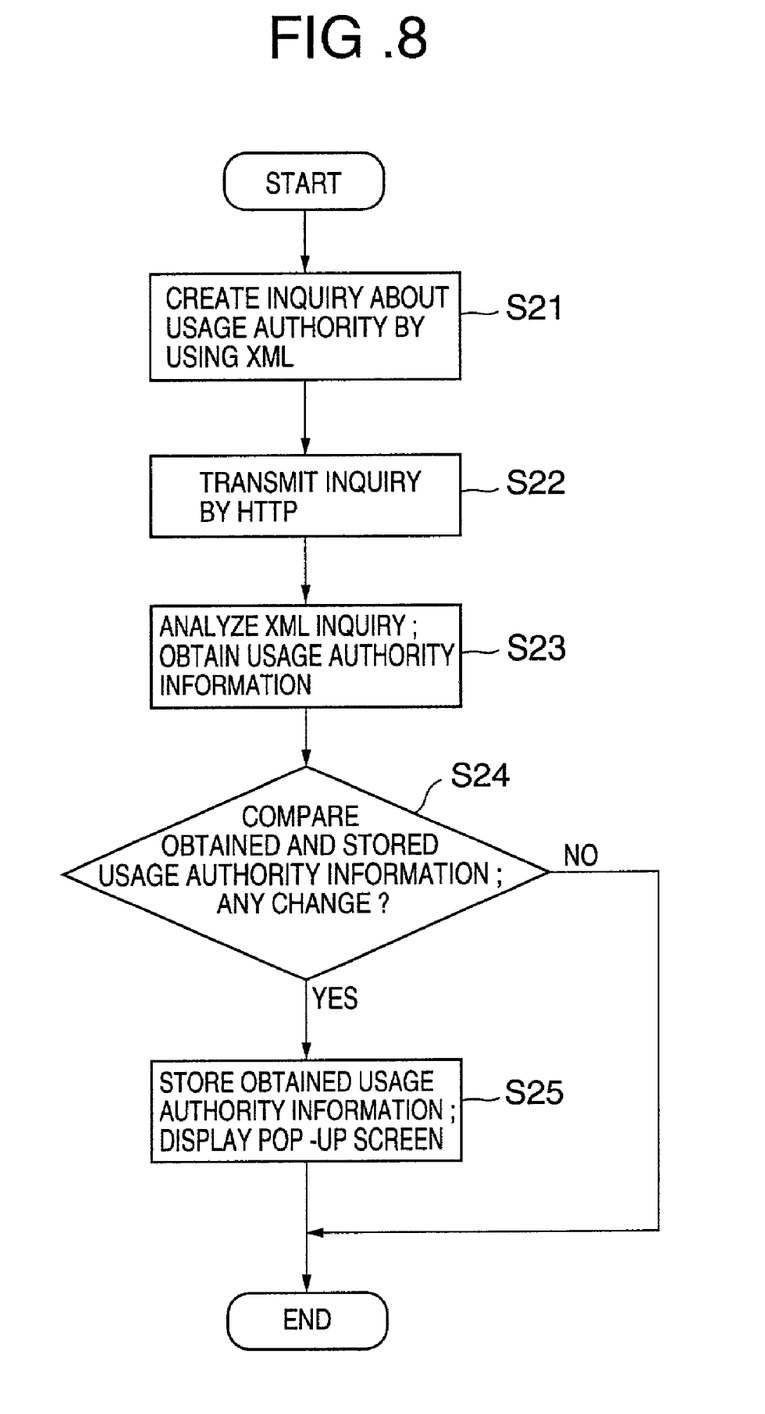
FIG. 8 is a flowchart of an operation of the user terminal apparatus of the second embodiment.

FIG. 8 is a flowchart of an operation of the usage authority inquiry part 14 of the user terminal apparatus 1 in the case of the user inquiring about the usage authority thereof according to this embodiment.

After the user terminal apparatus 1 is activated, in step S21, the usage authority inquiry part 14 of FIG. 5 creates an inquiry about the usage authority of the user by using XML to the printer 3 registered as a printer to be used. Then, in step S22, the user terminal apparatus 1 transmits the inquiry to the printer 3 by using the HTTP.

In step S23, when the user terminal apparatus 1 receives a response coded in XML from the printer 3, the usage authority inquiry part 14 analyzes the XML response and obtains information on the usage authority of the user. Then, in step S24, the user terminal apparatus 1 compares the obtained usage authority information with usage authority information of the user stored in the usage authority table 35 or the HDD to see whether there is any change from the stored usage authority information of the user. If there is any change (that is, "YES" in step S24), in step S25, the user terminal apparatus notifies the user of the change by using a pop-up screen, and stores the newly obtained usage authority information in the usage authority table 35.

Figure 9:
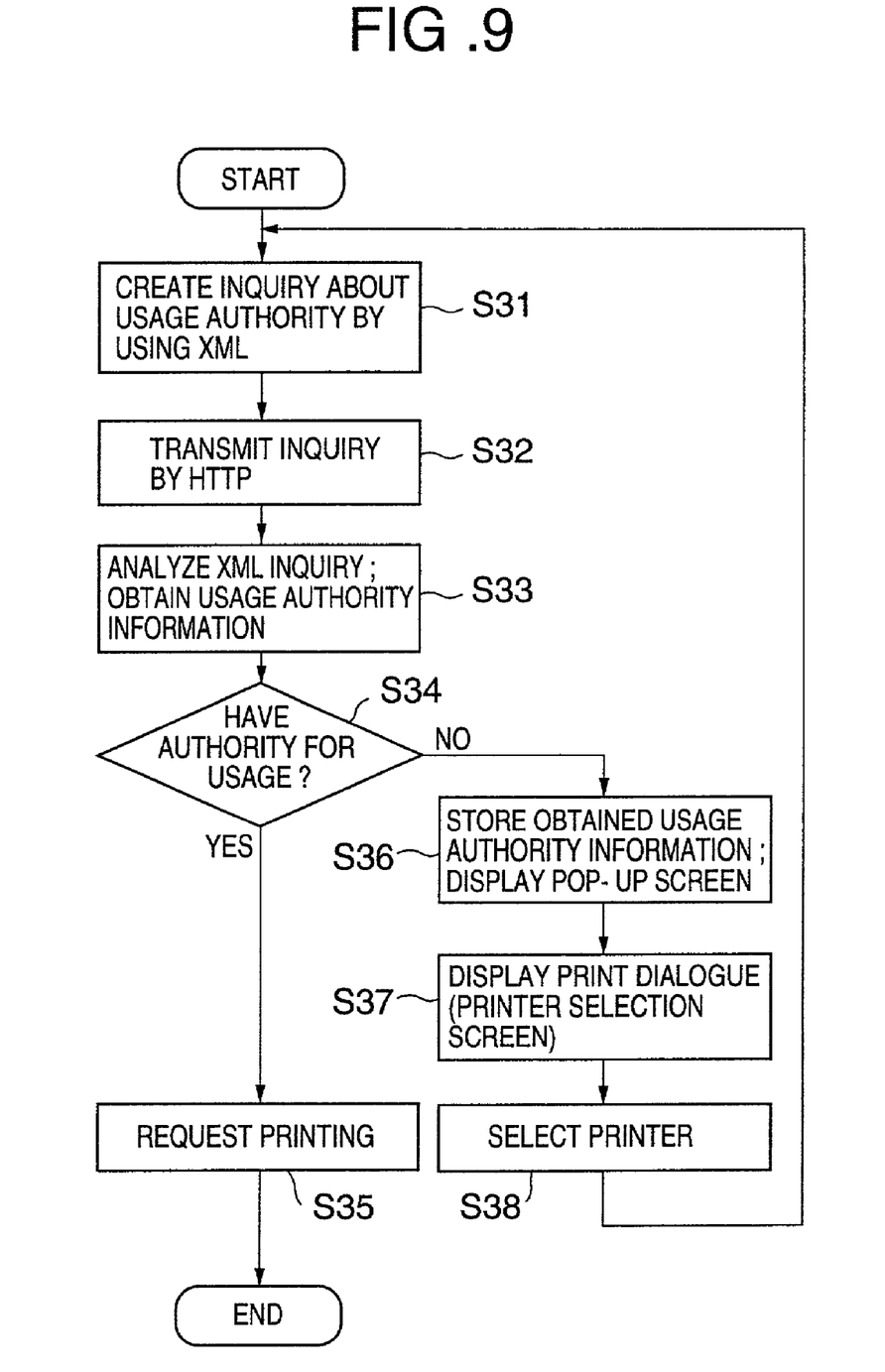
FIG. 9 is a flowchart of an operation of the user terminal apparatus of the second embodiment.

FIG. 9 is a flowchart of another operation of the usage authority inquiry part 14 of the user terminal apparatus 1 in the case of the user inquiring about the usage authority thereof according to this embodiment.

After the user terminal apparatus 1 activates a printing application, in step S31, the usage authority inquiry part 14 of FIG. 5 creates an inquiry about the usage authority of the user by using XML to the printer 3 selected as a printer to be used. Then, in step S32, the user terminal apparatus 1 transmits the inquiry to the printer 3 by using the HTTP.

In step S33, when the user terminal apparatus 1 receives a response coded in XML from the printer 3, the usage authority inquiry part 14 analyzes the XML response and obtains information on the usage authority of the user.

In step S34, the user terminal apparatus 1 determines whether the user has authority to use the printer 3 based on the obtained user authority information. If the user does not have usage authority for the printer 3 (that is, "NO" in step S34), in step S36, the user terminal apparatus 1 provides the user with a notification to that effect by displaying a pop-up screen and stores the newly obtained information in the usage authority table 35. Then, in step S37, the user terminal apparatus 1 again displays a print dialogue or a printer selection screen, and in step S38, waits for the user to select another printer for printing. If the user has usage authority for the printer 3 (that is, "YES" in step S34), in step S35, the user terminal apparatus 1 makes a print request to the printer 3.

In this embodiment, the usage authority management part 34 having the usage authority table 35 and the user information table 36 and the usage authority change notification part 37 are provided in the printer 3, but may be provided in the print server 2 of FIG. 1 or in the external usage authority management system 5 of FIG. 2.

According to the system of the second embodiment, the user is allowed to transmit the inquiry about her/his authority to use the printer 3 from the user terminal apparatus 1. Therefore, the printer 3 or the usage authority management system 5 (server) is free from managing a notification to the user. Further, the inquiry about the usage authority of the user is transmitted automatically to the printer 3 when the user terminal apparatus 1 is activated or before the printing request is transmitted to the printer 3. This allows the user to make the inquiry on her/his usage authorization with reduced efforts.

Third Embodiment

Next, a description will be given of a third embodiment of the present invention.

A printing system according to this embodiment is equal in configuration to any of the systems of FIGS. 1 and 2. Further, the printer 3 according to this embodiment is equal to the printer 3 of FIG. 5 of the second embodiment.

Figure 10:
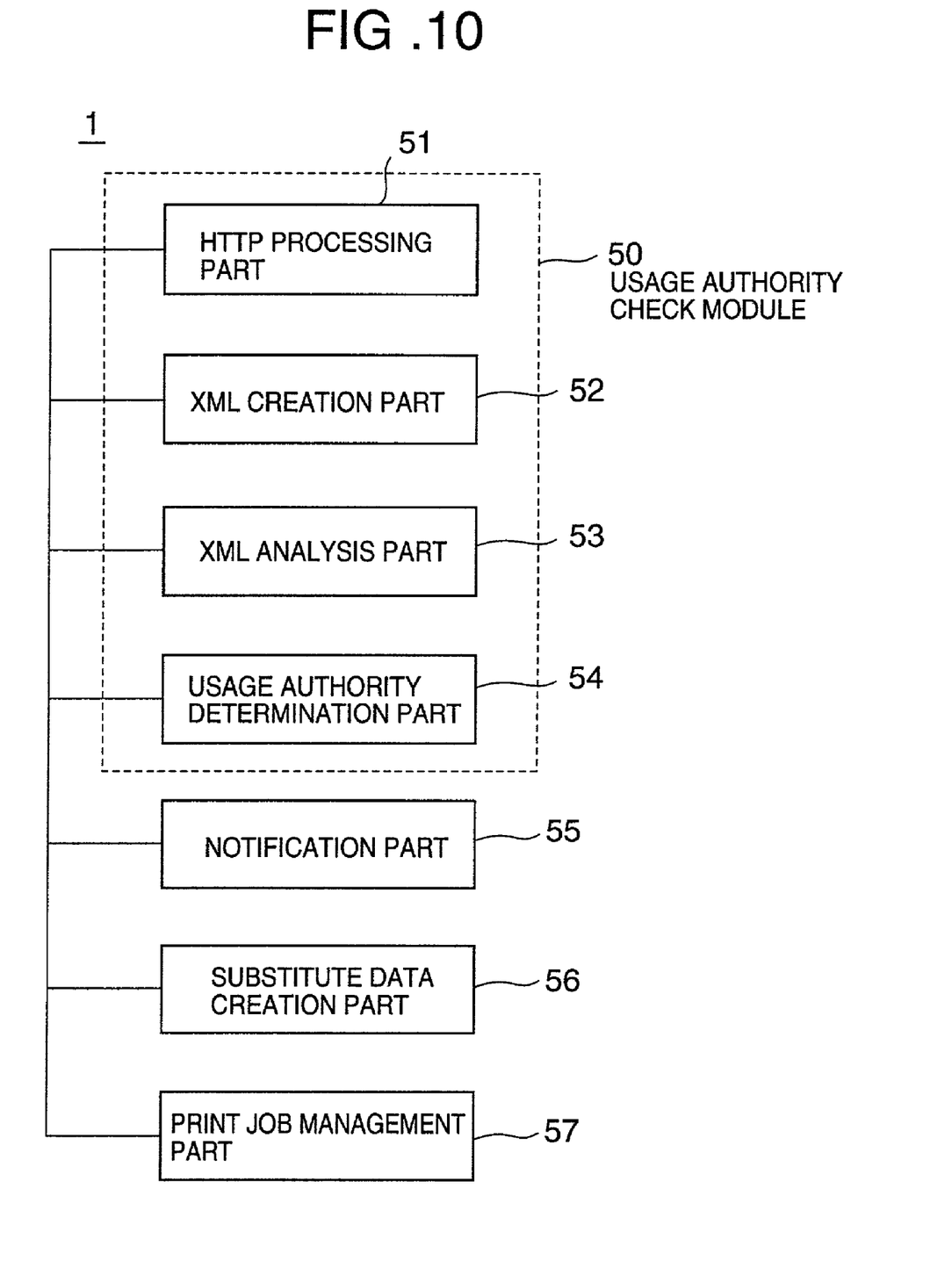
FIG. 10 is a functional block diagram of the user terminal apparatus according to a third embodiment of the present invention.

FIG. 10 is a functional block diagram of the user terminal apparatus 1 employed in the printing system of this embodiment.

The user terminal apparatus 1 of this embodiment includes a usage authority check module 50, a notification part 55, a substitute data creation part 56, and a print job management part 57. The usage authority check module 50 includes an HTTP processing part 51, an XML creation part 52, an XML analysis part 53, and a usage authority determination part 54.

The usage authority check module 50 performs processing with respect to determination as to whether the user has authority to use the printer 3. The HTTP processing part 51 performs processing in compliance with the HTTP to communicate with the printer 3 by the HTTP. The XML creation part 52 creates data to be transmitted to the printer by using XML. That is, the XML creation part 52 creates an inquiry to the printer 3. The XML analysis part 53 analyzes information received from the printer 3. That is, the XML analysis part 53 analyzes a response coded in XML from the printer 3 and obtains information on the usage authority of the user. The usage authority determination part 54 determines, based on the obtained usage authority information, whether the user has authority to use the printer 3.

The notification part 55 presents the user with a message based on a determination by the usage authority determination part 54. The substitute data creation part 56 creates substitute data for performing printing by only using functions that the user is authorized to use if the user has authority to use only a part of the functions of the printer 3. That is, the substitute data is obtained by modifying the printing conditions of the original print request. The print job management part 57 cancels or executes a print job.

In this embodiment, the HTTP is employed in data communication between the printer 3 and the user terminal apparatus 1. However, a protocol employed by the present invention is not limited to the HTTP. Further, although an XML document is used for inquiry about the usage authority of the user in this embodiment, other methods may be used for the inquiry.

Figure 11:
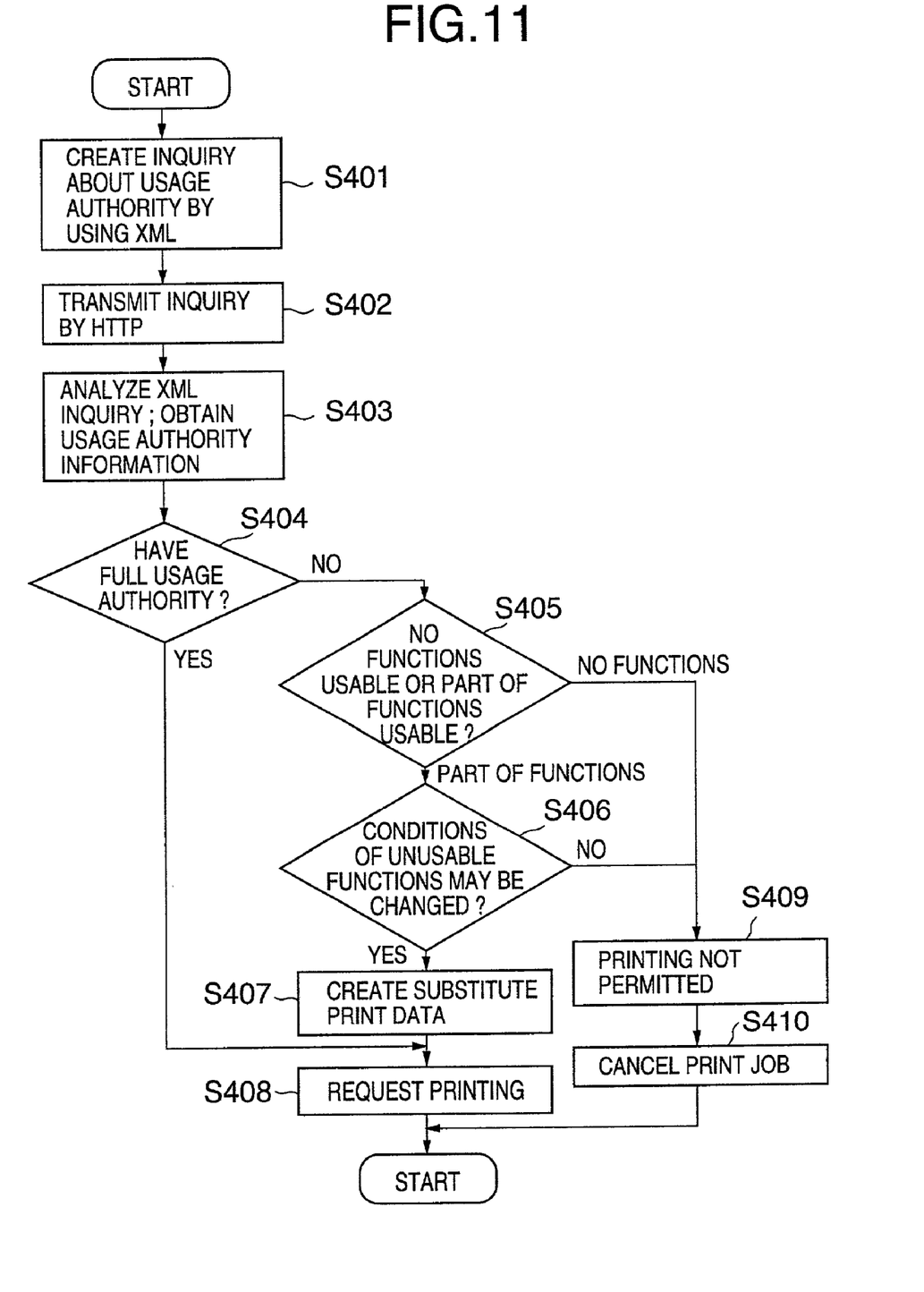
FIG. 11 is a flowchart of an operation of the user terminal apparatus in a case of modifying printing conditions based on usage authority of a user.

FIG. 11 is a flowchart of an operation of the user terminal apparatus 1 in the case of modifying printing conditions in accordance with the contents of the usage authority of the user.

After the user terminal apparatus 1 activates a printing application, in step S401, the XML creation part 52 of the user terminal apparatus 1 creates an inquiry about the usage authority of the user by using XML to the printer 3 selected as a printer to be used. Then, in step S402, the user terminal apparatus 1 communicates with the printer 3 by using the HTTP processing part 51 so as to transmit the inquiry to the printer 3.

In step S403, receiving an XML response from the printer 3, the user terminal apparatus causes the XML analysis part 53 to analyze the XML response, and obtains information on the usage authority of the user. Next, in step S404, the user terminal apparatus 1 causes the usage authority determination part 54 to analyze the obtained usage authority information so as to determine whether the user has full authority to use the printer 3, that is, whether the user is authorized to use all the functions of the printer 3.

If the user terminal apparatus 1 determines, as a result of the analysis, that the user does not have full authority to use the printer 3, that is, that the user is not authorized to use all the functions of the printer 3 ("NO" in step S404), in step S405, the usage authority determination part 54 further determines whether the user is authorized to use no functions or only a part of the functions.

If the usage authority determination part 54 determines in step S405 that the user is authorized to use no functions, in step S409, the notification part 55 presents the user with a message that printing is not permitted, and in step S410, the print job management part 57 cancels the print job.

If the usage authority determination part 54 determines in step S405 that the user is authorized to use only a part of the functions (printing conditions), in step S406, the notification part 55 asks the user whether the user agrees to modify the printing conditions, presenting the user with a message to that effect. If the user agrees to modify the printing conditions (that is, "YES" in step S406) in step S407, the substitute data creation part 56 creates substitute data for the printing conditions excluding functions that the user is not authorized to use. In step S408, the print job management part 57 requests the printer 3 to print the created substitute data and causes the printer 3 to perform the print job.

If the user does not agree to modify the printing conditions (that is, "NO" in step S406), in step S409, the notification part 55 presents the user with a message that printing is not permitted, and in step S410, the print job management part 57 cancels the print job.

Here, a description will be given, as a specific example of the above-described operation, of a case where color printing is performed.

If the user can use only monochrome printing, the notification part 55 presents the user with a message such as "Color printing is not permitted. Perform monochrome printing instead?"

If the user agrees to modify the printing conditions, the substitute data creation part 56 creates substitute data that sets printing conditions for monochrome printing, and the print job management part 57 causes the printer 3 to perform the print job.

On the other hand, if the user does not agree to modify the printing conditions, or the user is authorized to use neither color nor monochrome printing, the print job management part 57 cancels the print job.

Although the case of performing color printing is taken herein as an example, this case is not the sole example of the application of the present invention. For instance, the usage authority may be set for the resolution and/or the sheet size of the printer 3.

Figure 12:
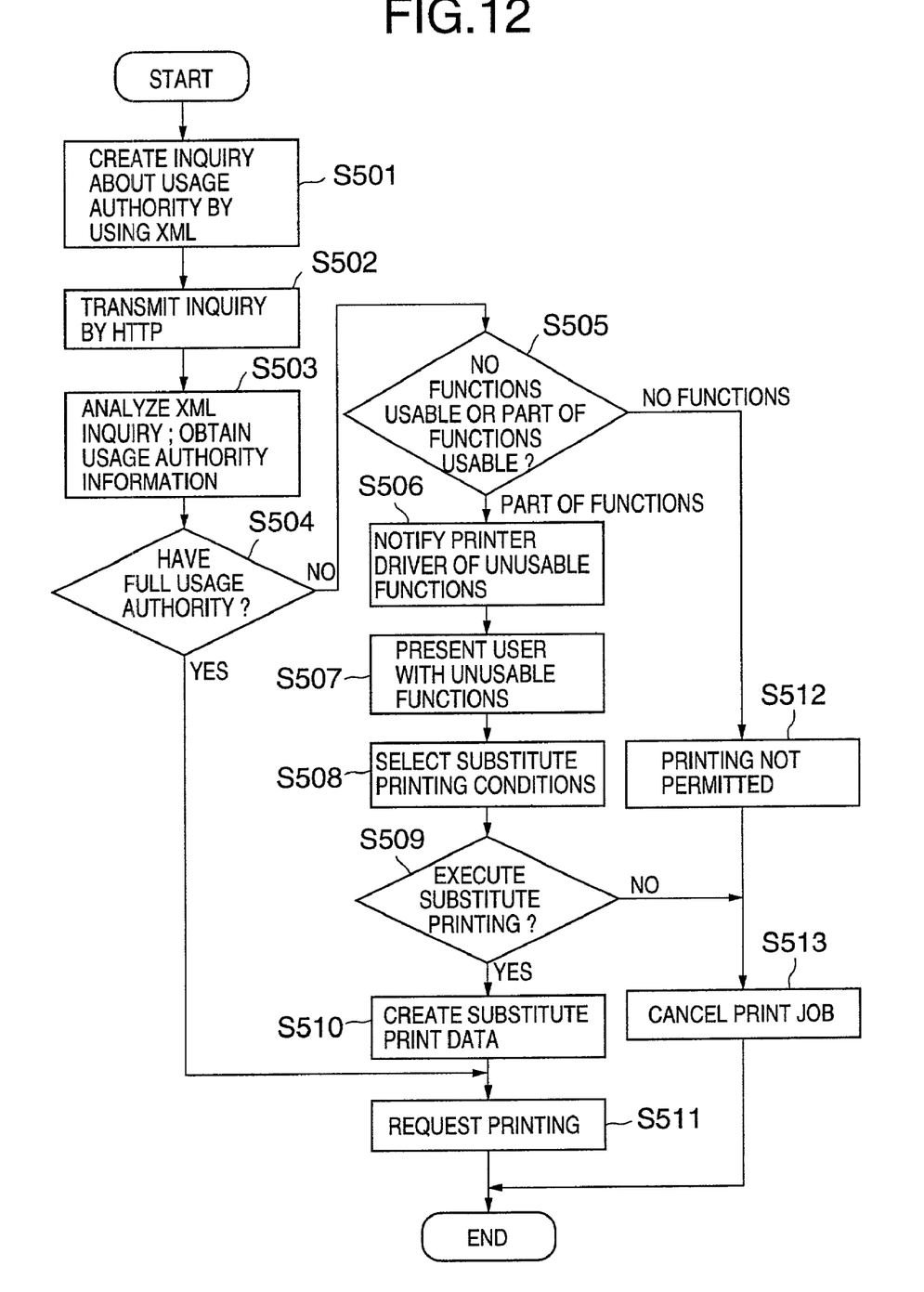
FIG. 12 is a flowchart of an operation of the user terminal apparatus in a case of the user modifying the printing conditions by her/himself.

FIG. 12 is a flowchart of an operation of the user terminal apparatus 1 in the case of the user modifying printing conditions by her/himself.

Steps S501 through S505 are equal to steps S401 through S405 of FIG. 11. If the usage authority determination part 54 determines in step S505 that the user is authorized to use no functions, in step S512, the notification part 55 presents the user with a message that printing is not permitted, and in step S513, the print job management part 57 cancels the print job.

If the usage authority determination part 54 determines in step S505 that the user is authorized to use only a part of the functions (printing conditions), in step S506, the usage authority check module 50 informs a printer driver (not shown in the drawing) that has created the print data of conditions (of functions) that the user is not authorized to use. When the printer driver receives the information from the usage authority check module 50, in step S507, the notification part 55 presents the user with this information by opening up a screen of the property of the printer 3. At this point, the notification part 55 may notify the user of the functions that the user is not authorized to use by displaying the information in a different color.

Further, the notification part 55 may present the information to the user so that the user cannot select the functions that the user is not authorized to use. Thus, in step S508, the user is urged to modify and reset the printing conditions.

Then, in step S509, the user determines whether to execute the print job with the modified or substitute printing conditions. If the user determines not to execute substitute printing (that is, "NO" in step S509), in step S513, the print job management part 57 cancels the print job.

On the other hand, if the user determines to perform substitute printing within the range of the functions that the user is authorized to use (that is, "YES" in step S509), in step S510, the substitute data creation part 56 creates substitute data based on the printing conditions reset by the user. In step S511, the print job management part 57 requests and causes the printer 3 to print based on the created substitute data.

In this embodiment, the usage authority management part 34 having the usage authority table 35 and the user information table 36, and the usage authority change notification part 37 are provided in the printer 3, but may be provided in the print server 2 of FIG. 1 or in the external usage authority management system 5 of FIG. 2.

According to the system of the-third embodiment, the usage authority of the user may be set for each of the functions of the printer 3. With information on the usage authority of the user set for each of the functions, a printing function can be provided with finer control.

Further, printing is performable by creating the substitute data based on the printing conditions excluding functions (printing conditions) that the user is not authorized to use. Thereby, printing can be performed only with functions within the range of the usage authority of the user even if desired printing conditions include the functions that the user is not authorized to use.

Therefore, this system is effective in such a case where the user desires to print a document anyway when the user wishes to use a color printing function or a finisher function but has no usage authorization therefor.

Further, the user is allowed to set conditions for substitute printing by her/himself if the user is not authorized to use all the functions that the original printing conditions require or use. Thereby, the user can set the printing conditions in detail.

Further, the user is allowed to create substitute data by modifying the original printing conditions by using a part setting the printing conditions. Thereby, the user is allowed to set conditions for substitute printing by using the same interface as used by the printer driver, for instance. This requires only an I/F for notifying the printer driver of functions that the user is not authorized to use and a part presenting the user with the functions that cannot be used in the user interface part of the printer driver to be added to the system. Therefore, it is not necessary to introduce a new module for generating the substitute data into the system, thus simplifying the printing system.

The present invention is not limited to the specifically disclosed embodiments, but variations and modifications may be made without departing from the scope of the present invention.

The present application is based on Japanese priority applications No. 2000-402703 filed on Dec. 28, 2000 and No. 2001-110579 filed on Apr. 9, 2001, the entire contents of which are hereby incorporated by reference.

What is claimed is:

1. A printing system, comprising:
a printing apparatus;
a terminal apparatus configured to transmit information including a request to execute a specific print job and for receiving information, the terminal apparatus including inquiry means for transmitting, to the printing apparatus, an inquiry regarding authority of a registered user to use the printing apparatus, automatically upon activation of the terminal apparatus or automatically upon activation of a printing application by the registered user;
notification means for notifying, in response to the inquiry, the registered user of said printing apparatus of information on the authority of the registered user to use said printing apparatus to execute any print job prior to the transmission of the request to execute the specific print job to be printed by the printing apparatus, but after the registered user has established access to use of said printing apparatus, wherein the notification means is unaware of the specific print job when notifying the registered user, and wherein the registered user is unable to set the authority of the registered user to use said printing apparatus; and
a network connecting said printing apparatus, said terminal apparatus, and said notification means so that information transmission and reception in the system is performed through an electrical signal via said network.

2. The printing system as claimed in claim 1, wherein said network is a local area network.

3. The printing system as claimed in claim 1, wherein said printing apparatus comprises said notification means.

4. The printing system as claimed in claim 1, wherein said notification means notifies the user of the information on the authority of the user to use said printing apparatus through said terminal apparatus.

5. The printing system as claimed in claim 1, wherein said notification means notifies the user of a change in the authority of the user to use said printing apparatus when the change is effected.

6. The printing system as claimed in claim 1, wherein said notification means notifies the user of an entry of the authority of the user to use said printing apparatus when said printing apparatus is newly introduced to the system.

7. The printing system as claimed in claim 1, further comprising:
setting means for setting the authority of the user to use said printing apparatus; and
determination means for determining whether to perform printing based on user information or job information included in the print job transmitted from said terminal apparatus and on the authority of the user to use said printing apparatus,
wherein said setting means and said determination means are connected to said network.

8. The printing system as claimed in claim 7, further comprising usage authority management means for managing the authority of the user to use said printing apparatus, said usage authority management means connected to said network and comprising said notification means.

9. The printing system as claimed in claim 8, wherein said setting means, said determination means, said notification means, and said usage authority management means are realized by a processing operation of a central processing unit.

10. The printing system as claimed in claim 7, wherein:
said terminal apparatus comprises:
   inquiry means for transmitting to said determination means an inquiry as to whether the user has the authority to use said printing apparatus; and
   presentation means for presenting the user with a result of the inquiry received from said notification means; and
said notification means notifies the user whether the user has the authority to use said printing apparatus upon receiving the inquiry transmitted from said inquiry means.

11. The printing system as claimed in claim 10, wherein said inquiry means transmits the inquiry when said terminal apparatus is activated.

12. The printing system as claimed in claim 10, wherein said inquiry means transmits the inquiry before said terminal apparatus transmits the request to execute the specific print job to said printing apparatus.

13. The printing system as claimed in claim 7, wherein the authority of the user to use said printing apparatus is set for each of functions of said printing apparatus.

14. The printing system as claimed in claim 13, wherein said terminal apparatus further comprises means for modifying printing conditions of the specific print job so that the printing conditions exclude a printing condition using a function that the user is not authorized to use.

15. The printing system as claimed in claim 13, wherein said terminal apparatus further comprises means for modifying a printing condition of the specific print job which condition uses a function that the user is not authorized to use so that the printing condition uses only a function that the user is authorized to use.

16. The printing system as claimed in claim 13, wherein said terminal apparatus further comprises means for requesting the user to modify printing conditions of the specific print job so that the printing conditions exclude a printing condition using a function that the user is not authorized to use.

17. The printing system as claimed in claim 13, wherein said terminal apparatus further comprises means for requesting the user to modify a printing condition of the specific print job which condition uses a function that the user is not authorized to use so that the printing condition uses only a function that the user is authorized to use.

18. The printing system as claimed in claim 13, wherein said terminal apparatus obtains the information on the authority of the user set for each of the functions of said printing apparatus and presents the user with the obtained information before transmitting the request to execute the specific print job to said printing apparatus.

19. A printing apparatus, comprising:
a central processing unit controlling an operation of the entire printing apparatus;
a usage authority management part storing information on authority of a registered user to use the printing apparatus to execute any print job;
notification means for notifying, using a mail address of the registered user, the registered user of the information on authority of the registered user to use the printing apparatus to execute any print job, automatically in response to detecting that the information on authority of a registered user to use the printing apparatus has been input or changed by a printer manager, prior to transmission of a request to execute a specific print job to be printed by the printing apparatus, but after the registered user has established access to use of said printing apparatus, wherein the notification means is unaware of the specific print job when notifying the registered user, and wherein the registered user is unable to set the authority of the registered user to use said printing apparatus.

20. The printing apparatus as claimed in claim 19, wherein said notification means is connected to a terminal apparatus via a network and notifies the user of the information on the authority thereof to use the printing apparatus through the terminal apparatus.

21. The printing apparatus as claimed in claim 20, wherein the network is a local area network.

22. The printing apparatus as claimed in claim 20, further comprising setting means for setting the authority of the user to use the printing apparatus, said setting means being connected to the network.

23. The printing apparatus as claimed in claim 20, wherein said notification means notifies the user of a change in the authority of the user to use said printing apparatus when the change is effected.

24. The printing apparatus as claimed in claim 20, wherein said notification means notifies the user of an entry of the authority of the user to use said printing apparatus when said printing apparatus is newly introduced to the system.

25. The printing apparatus as claimed in claim 20, wherein said notification means notifies the user whether the user has the authority to use said printing apparatus upon receiving an inquiry transmitted from the terminal apparatus.

26. The printing apparatus as claimed in claim 25, wherein the authority of the user to use said printing apparatus is set for each of functions of the printing apparatus.

27. A terminal apparatus, comprising:
a central processing unit controlling an operation of the entire terminal apparatus;
inquiry means for transmitting, to a printing apparatus, an inquiry as to whether a registered user of the printing apparatus has authority to use the printing apparatus to execute any print job, automatically upon activation of the terminal apparatus or automatically upon activation of a printing application by the registered user; and
presentation means for presenting the registered user with a result of the inquiry,
wherein the terminal apparatus is configured to receive information as to the authority of the registered user to use the printing apparatus to execute any print job, prior to transmission of a request to execute a specific print job to be printed by the printing apparatus, but after the registered user has established access to use of said printing apparatus such that the information as to the authority of the registered user to use the printing apparatus is determined without knowledge of the specific print job, and wherein the registered user is unable to set the authority of the registered user to use said printing apparatus.

28. The terminal apparatus as claimed in claim 27, wherein said inquiry means and said presentation means are connected via a network to the printing apparatus, determination means for determining whether to perform printing based on user information or job information included in the specific print job transmitted from the terminal apparatus and on the authority of the user to use the printing apparatus, and notification means for notifying the user of information on the authority of the user to use the printing apparatus so that said inquiry means transmits the inquiry to the determination means and said presentation means receives the result from the notification means.

29. The terminal apparatus as claimed in claim 28, wherein the network is a local area network.

30. The terminal apparatus as claimed in claim 27, wherein said inquiry means transmits the inquiry when the terminal apparatus is activated.

31. The terminal apparatus as claimed in claim 27, wherein said inquiry means transmits the inquiry before the terminal apparatus transmits the request to execute the specific print job to the printing apparatus.

32. The terminal apparatus as claimed in claim 27, wherein the authority of the user to use the printing apparatus is set for each of functions of the printing apparatus.

33. The terminal apparatus as claimed in claim 32, further comprising means for modifying printing conditions of the specific print job so that the printing conditions exclude a printing condition using a function that the user is not authorized to use.

34. The terminal apparatus as claimed in claim 32, further comprising means for modifying a printing condition of the specific print job which condition uses a function that the user is not authorized to use so that the printing condition uses only a function that the user is authorized to use.

35. The terminal apparatus as claimed in claim 32, further comprising means for requesting the user to modify printing conditions of the specific print job so that the printing conditions exclude a printing condition using a function that the user is not authorized to use.

36. The terminal apparatus as claimed in claim 32, further comprising means for requesting the user to modify a printing condition of the specific print job which condition uses a function that the user is not authorized to use so that the printing condition uses only a function that the user is authorized to use.

37. The terminal apparatus as claimed in claim 32, wherein the information on the authority of the user set for each of the functions of the printing apparatus is obtained and presented to the user before the request to execute the specific print job is transmitted to the printing apparatus.

38. A printing method, comprising:
   (a) setting authority of a registered user of a printing apparatus to use the printing apparatus to execute any print job; and
   (b) notifying, using a mail address of the registered user, the registered user of information on the authority of the registered user to use the printing apparatus to execute any print job, automatically in response to detecting that the information on authority of a registered user to use the printing apparatus has been input or changed by a printer manager, through an electrical signal via a network, prior to transmission of a request to execute a specific print job to be printed by the printing apparatus, but after the registered user has established access to use of said printing apparatus, wherein the setting step is performed without knowledge of the specific print job, and wherein the registered user is unable to set the authority of the registered user to use said printing apparatus.

39. The printing method as claimed in claim 38, wherein the network is a local area network.

40. The printing method as claimed in claim 38, wherein the printing apparatus performs said step (b).

41. The printing method as claimed in claim 38, wherein said step (b) notifies the user of the information on the authority of the user to use the printing apparatus through a terminal apparatus.

42. The printing method as claimed in claim 38, wherein said step (b) notifies the user of a change in the authority of the user to use the printing apparatus when the change is effected.

43. The printing method as claimed in claim 38, wherein said step (b) notifies the user of an entry of the authority of the user to use the printing apparatus when the printing apparatus is newly introduced.

44. The printing method as claimed in claim 38, further comprising the step of (c) determining whether to perform printing based on user information or job information included in the specific print job and on the authority of the user to use the printing apparatus.

45. The printing method as claimed in claim 44, wherein said steps (a) through (c) are performed by a processing operation of a central processing unit.

46. The printing method as claimed in claim 44, further comprising the steps of:
   (d) inquiring whether the user has the authority to use the printing apparatus; and
   (e) presenting the user with a result of said step (d),
   wherein said step (b) notifies the user whether the user has the authority to use the printing apparatus when said step (d) is performed.

47. The printing method as claimed in claim 46, wherein said steps (d) and (e) are performed by a terminal apparatus.

48. The printing method as claimed in claim 46, wherein said step (d) is performed when a terminal apparatus is activated.

49. The printing method as claimed in claim 46, further comprising the step of (f) transmitting the request to execute the specific print job to the printing apparatus, wherein said step (d) is performed before said step (f).

50. The printing method as claimed in claim 49, wherein said step (f) is performed by a terminal apparatus.

51. The printing method as claimed in claim 49, wherein said steps (d) through (f) are performed by a processing operation of a central processing unit. through an electrical signal via the network.

52. The printing method as claimed in claim 46, wherein the authority of the user to use the printing apparatus is set for each of functions of the printing apparatus.

53. The printing method as claimed in claim 52, further comprising the step of (f) modifying printing conditions of the specific print job so that the printing conditions exclude a printing condition using a function that the user is not authorized to use.

54. The printing method as claimed in claim 53, wherein said step (f) is performed by a terminal apparatus.

55. The printing method as claimed in claim 52, further comprising the step of (f) modifying a printing condition of the specific print job which condition uses a function that the user is not authorized to use so that the printing condition uses only a function that the user is authorized to use.

56. The printing method as claimed in claim 55, wherein said step (f) is performed by a terminal apparatus.

57. The printing method as claimed in claim 52, further comprising the step of (f) requesting the user to modify printing conditions of the specific print job so that the printing conditions exclude a printing condition using a function that the user is not authorized to use.

58. The printing method as claimed in claim 57, wherein said step (f) is performed by a terminal apparatus.

59. The printing method as claimed in claim 52, further comprising the step of (f) requesting the user to modify a printing condition of the specific print job which condition uses a function that the user is not authorized to use so that the printing condition uses only a function that the user is authorized to use.

60. The printing method as claimed in claim 59, wherein said step (f) is performed by a terminal apparatus.

61. A computer-readable storage medium having encoded therein a program for printing, said program causing a computer to execute the steps of:
 (a) setting authority of a registered user of a printing apparatus to use the printing apparatus to execute any print job; and
 (b) notifying, using a mail address of the registered user, the registered user of information on the authority of the registered user to use the printing apparatus to execute any print job, automatically in response to detecting that the information on authority of a registered user to use the printing apparatus has been input or changed by a printer manager, through an electrical signal via a network, prior to transmission of a request to execute a specific print job to be printed by the printing apparatus, but after the registered user has established access to use of said printing apparatus, wherein the setting step is performed without knowledge of the specific print job, and wherein the registered user is unable to set the authority of the registered user to use said printing apparatus.

62. The storage medium as claimed in claim 61, wherein the network is a local area network.

63. The storage medium as claimed in claim 61, wherein the computer causes the printing apparatus to perform said step (b).

64. The storage medium as claimed in claim 61, wherein said step (b) notifies the user of the information on the authority of the user to use the printing apparatus through a terminal apparatus.

65. The storage medium as claimed in claim 61, wherein said step (b) notifies the user of a change in the authority of the user to use the printing apparatus when the change is effected.

66. The storage medium as claimed in claim 61, wherein said step (b) notifies the user of an entry of the authority of the user to use the printing apparatus when the printing apparatus is newly introduced.

67. The storage medium as claimed in claim 61, wherein said program causes the computer to further execute the step of (c) determining whether to perform printing based on user information or job information included in the specific print job and on the authority of the user to use the printing apparatus.

68. The storage medium as claimed in claim 67, wherein said program causes the computer to further execute the steps of:
 (d) inquiring whether the user has the authority to use the printing apparatus; and
 (e) presenting the user with a result of said step (d), wherein said step (b) notifies the user whether the user has the authority to use the printing apparatus when said step (d) is performed.

69. The storage medium as claimed in claim 68, wherein the computer causes a terminal apparatus to perform said steps (d) and (e).

70. The storage medium as claimed in claim 68, wherein said step (d) is performed when a terminal apparatus is activated.

71. The storage medium as claimed in claim 68, wherein said program causes the computer to further execute the step of (f) transmitting the request to execute the specific print job to the printing apparatus, wherein said step (d) is performed before said step (f).

72. The storage medium as claimed in claim 71, wherein the computer causes a terminal apparatus to perform said step (f).

73. The storage medium as claimed in claim 71, wherein said steps (d) through (f) are performed through an electrical signal via the network.

74. The storage medium as claimed in claim 68, wherein the authority of the user to use the printing apparatus is set for each of functions of the printing apparatus.

75. The storage medium as claimed in claim 74, wherein said program causes the computer to further execute the step of (f) modifying printing conditions of the specific print job so that the printing conditions exclude a printing condition using a function that the user is not authorized to use.

76. The storage medium as claimed in claim 75, wherein the computer causes a terminal apparatus to perform said step (f).

77. The storage medium as claimed in claim 74, wherein said program causes the computer to further execute the step of (f) modifying a printing condition of the specific print job which condition uses a function that the user is not authorized to use so that the printing condition uses only a function that the user is authorized to use.

78. The storage medium as claimed in claim 77, wherein the computer causes a terminal apparatus to perform said step (f).

79. The storage medium as claimed in claim 74, wherein said program causes the computer to further execute the step of (f) requesting the user to modify printing conditions of the specific print job so that the printing conditions exclude a printing condition using a function that the user is not authorized to use.

80. The storage medium as claimed in claim 79, wherein the computer causes a terminal apparatus to perform said step (f).

81. The storage medium as claimed in claim 74, wherein said program causes the computer to further execute the step of (f) requesting the user to modify a printing condition of the specific print job which condition uses a function that the user is not authorized to use so that the printing condition uses only a function that the user is authorized to use.

82. The storage medium as claimed in claim 81, wherein the computer causes a terminal apparatus to perform said step (f).

83. A printing system, comprising:
 a printing apparatus;
 a terminal apparatus configured to transmit information including a request to execute a specific print job and receiving information, the terminal apparatus including inquiry means for transmitting, to the printing apparatus, an inquiry regarding authority of a registered user to use the printing apparatus, automatically upon activation of the terminal apparatus or automatically upon activation of a printing application by the registered user;
 a notification part notifying, in response to the inquiry, the registered user of said printing apparatus of information on the authority of the registered user to use said printing apparatus to execute any print job prior to the transmission of the request to execute the specific print job to be printed by the printing apparatus, but after the registered user has established access to use of said printing apparatus; and a network connecting said printing apparatus, said terminal apparatus, and said notification part so that information transmission and reception in the system is performed through an electrical signal via said network, wherein the notification part is unaware of the specific print job when notifying the registered user, and wherein the registered user is unable to set the authority of the registered user to use said printing apparatus.

84. The printing system as claimed in claim 83, wherein said network is a local area network.

85. The printing system as claimed in claim 83, wherein said printing apparatus comprises said notification part.

86. The printing system as claimed in claim 83, wherein said notification part notifies the user of the information on the authority of the user to use said printing apparatus through said terminal apparatus.

87. The printing system as claimed in claim 83, wherein said notification part notifies the user of a change in the authority of the user to use said printing apparatus when the change is effected.

88. The printing system as claimed in claim 83, wherein said notification part notifies the user of an entry of the authority of the user to use said printing apparatus when said printing apparatus is newly introduced to the system.

89. The printing system as claimed in claim 83, further comprising:

a setting part setting the authority of the user to use said printing apparatus; and a determination part determining whether to perform printing based on user information or job information included in the specific print job transmitted from said terminal apparatus and on the authority of the user to use said printing apparatus, wherein said setting part and said determination part are connected to said network.

90. The printing system as claimed in claim 89, further comprising a usage authority management part managing the authority of the user to use said printing apparatus, said usage authority management part connected to said network and comprising said notification part.

91. The printing system as claimed in claim 90, wherein said setting part, said determination part, said notification part, and said usage authority management part are realized by a processing operation of a central processing unit.

92. The printing system as claimed in claim 89, wherein: said terminal apparatus comprises:

an inquiry part transmitting to said determination part an inquiry as to whether the user has the authority to use said printing apparatus; and a presentation part presenting the user with a result of the inquiry received from said notification part; and said notification part notifies the user whether the user has the authority to use said printing apparatus upon receiving the inquiry transmitted from said inquiry part.

93. The printing system as claimed in claim 92, wherein said inquiry part transmits the inquiry when said terminal apparatus is activated.

94. The printing system as claimed in claim 92, wherein said inquiry part transmits the inquiry before said terminal apparatus transmits the request to execute the specific print job to said printing apparatus.

95. The printing system as claimed in claim 89, wherein the authority of the user to use said printing apparatus is set for each of functions of said printing apparatus.

96. The printing system as claimed in claim 95, wherein said terminal apparatus further comprises a part modifying printing conditions of the specific print job so that the printing conditions exclude a printing condition using a function that the user is not authorized to use.

97. The printing system as claimed in claim 95, wherein said terminal apparatus further comprises a part modifying a printing condition of the specific print job which condition uses a function that the user is not authorized to use so that the printing condition uses only a function that the user is authorized to use.

98. The printing system as claimed in claim 95, wherein said terminal apparatus further comprises a part requesting the user to modify printing conditions of the specific print job so that the printing conditions exclude a printing condition using a function that the user is not authorized to use.

99. The printing system as claimed in claim 95, wherein said terminal apparatus further comprises a part requesting the user to modify a printing condition of the specific print job which condition uses a function that the user is not authorized to use so that the printing condition uses only a function that the user is authorized to use.

100. The printing system as claimed in claim 95, wherein said terminal apparatus obtains the information on the authority of the user set for each of the functions of said printing apparatus and presents the user with the obtained information before transmitting the request to execute the specific print job to said printing apparatus.

101. A printing apparatus, comprising:

a central processing unit controlling an operation of the entire printing apparatus;

a usage authority management part storing information on authority of a registered user to use the printing apparatus to execute any print job;

a notification part notifying, using a mail address of the registered user, the registered user of the information on authority of the registered user to use the printing apparatus to execute any print job, automatically in response to detecting that the information on authority of a registered user to use the printing apparatus has been input or changed by a printer manager, prior to transmission of a request to execute a specific print job to be printed by the printing apparatus, but after the registered user has established access to use of said printing apparatus, wherein the notification part is unaware of the specific print job when notifying the registered user, and wherein the registered user is unable to set the authority of the registered user to use said printing apparatus.

102. The printing apparatus as claimed in claim 101, wherein said notification part is connected to a terminal apparatus via a network and notifies the user of the information on the authority thereof to use the printing apparatus through the terminal apparatus.

103. The printing apparatus as claimed in claim 102, wherein the network is a local area network.

104. The printing apparatus as claimed in claim 102, further comprising a setting part setting the authority of the user to use the printing apparatus, said setting part being connected to the network.

105. The printing apparatus as claimed in claim 102, wherein said notification part notifies the user of a change in the authority of the user to use said printing apparatus when the change is effected.

106. The printing apparatus as claimed in claim 102, wherein said notification part notifies the user of an entry of the authority of the user to use said printing apparatus when said printing apparatus is newly introduced to the system.

107. The printing apparatus as claimed in claim 102, wherein said notification part notifies the user whether the user has the authority to use said printing apparatus upon receiving an inquiry transmitted from the terminal apparatus.

108. The printing apparatus as claimed in claim 107, wherein the authority of the user to use said printing apparatus is set for each of functions of the printing apparatus.

109. A terminal apparatus, comprising:
a central processing unit controlling an operation of the entire terminal apparatus;
an inquiry part transmitting, to a printing apparatus, an inquiry as to whether a registered user of the printing apparatus has authority to use the printing apparatus to execute any print job, automatically upon activation of the terminal apparatus or automatically upon activation of a printing application by the registered user; and
a presentation part presenting the registered user with a result of the inquiry,
wherein the terminal apparatus is configured to receive information as to the authority of the registered user to use the printing apparatus to execute any print job, prior to transmission of a request to execute a specific print job to be printed by the printing apparatus, but after the registered user has established access to use of said printing apparatus such that the information as to the authority of the registered user to use the printing apparatus is determined without knowledge of the specific print job, and wherein the registered user is unable to set the authority of the registered user to use said printing apparatus.

110. The terminal apparatus as claimed in claim 109, wherein said inquiry part and said presentation part are connected via a network to the printing apparatus, a determination part determining whether to perform printing based on user information or job information included in the specific print job transmitted from the terminal apparatus and on the authority of the user to use the printing apparatus, and a notification part notifying the user of information on the authority of the user to use the printing apparatus so that said inquiry part transmits the inquiry to the determination part and said presentation part receives the result from the notification part.

111. The terminal apparatus as claimed in claim 110, wherein the network is a local area network.

112. The terminal apparatus as claimed in claim 109, wherein said inquiry part transmits the inquiry when the terminal apparatus is activated.

113. The terminal apparatus as claimed in claim 109, wherein said inquiry part transmits the inquiry before the terminal apparatus transmits the request to execute the specific print job to the printing apparatus.

114. The terminal apparatus as claimed in claim 109, wherein the authority of the user to use the printing apparatus is set for each of functions of the printing apparatus.

115. The terminal apparatus as claimed in claim 114, further comprising a part modifying printing conditions of the specific print job so that the printing conditions exclude a printing condition using a function that the user is not authorized to use.

116. The terminal apparatus as claimed in claim 114, further comprising a part modifying a printing condition of the specific print job which condition uses a function that the user is not authorized to use so that the printing condition uses only a function that the user is authorized to use.

117. The terminal apparatus as claimed in claim 114, further comprising a part requesting the user to modify printing conditions of the specific print job so that the printing conditions exclude a printing condition using a function that the user is not authorized to use.

118. The terminal apparatus as claimed in claim 114, further comprising a part requesting the user to modify a printing condition of the specific print job which condition uses a function that the user is not authorized to use so that the printing condition uses only a function that the user is authorized to use.

119. The terminal apparatus as claimed in claim 114, wherein the information on the authority of the user set for each of the functions of the printing apparatus is obtained and presented to the user before the request to execute the specific print job is transmitted to the printing apparatus.

* * * * *